United States Patent [19]
Ernst

[11] 3,943,606
[45] Mar. 16, 1976

[54] HANGER MEMBER

[76] Inventor: Donald J. Ernst, 524 West Greenfield Ave., Milwaukee, Wis. 53204

[22] Filed: May 2, 1974

[21] Appl. No.: 466,161

[52] U.S. Cl................. 24/3 R; 17/44.2; 24/30.5 W
[51] Int. Cl.²...................... A22B 1/00; B65D 77/10
[58] Field of Search......... 24/243 K, 245, 3 M, 3 R, 24/3 B, 30.5 P, 30.5 W, 30.5 T, 30.5 R, 30.5; 426/105, 108; 17/49, 44.2; 248/317

[56] References Cited
UNITED STATES PATENTS

| | | | |
|---|---|---|---|
| 2,972,791 | 2/1961 | Kelem | 24/30.5 W |
| 3,007,666 | 11/1961 | Hamel | 17/44.2 X |
| 3,043,547 | 7/1962 | Reich | 17/44.2 X |
| 3,128,515 | 4/1964 | Cox | 24/30.5 T |
| 3,182,365 | 5/1965 | Crawford et al. | 24/243 K UX |
| 3,283,383 | 11/1966 | Heath | 24/245 R |
| 3,400,433 | 9/1968 | Klenz | 24/30.5 W |
| 3,422,497 | 1/1969 | Lyons | 24/3 R |
| 3,565,640 | 2/1971 | Dohlmann | 248/317 X |
| 3,780,400 | 12/1973 | Hinsperger | 24/245 R X |

FOREIGN PATENTS OR APPLICATIONS

| | | | |
|---|---|---|---|
| 1,126,130 | 7/1956 | France | 24/30.5 P |
| 1,468,567 | 12/1966 | France | 24/30.5 P |

Primary Examiner—Donald A. Griffin
Attorney, Agent, or Firm—William H. Nehrkorn

[57] ABSTRACT

An inexpensive thermoplastic member for hanging sausage casings and a method of clipping the same to such casings.

The hanging member is a compact one piece device comprising a stem, anchorage means positioned generally along one posterior end thereof and adapted to anchor the stem to the casing and a generally circular loop opposite thereto for hanging or looping the casing during sausage processing operations.

The hanging member is attached to the sausage casing by clipping a metal fastener about the casing and stem intermediate the anchorage means and loop.

3 Claims, 7 Drawing Figures

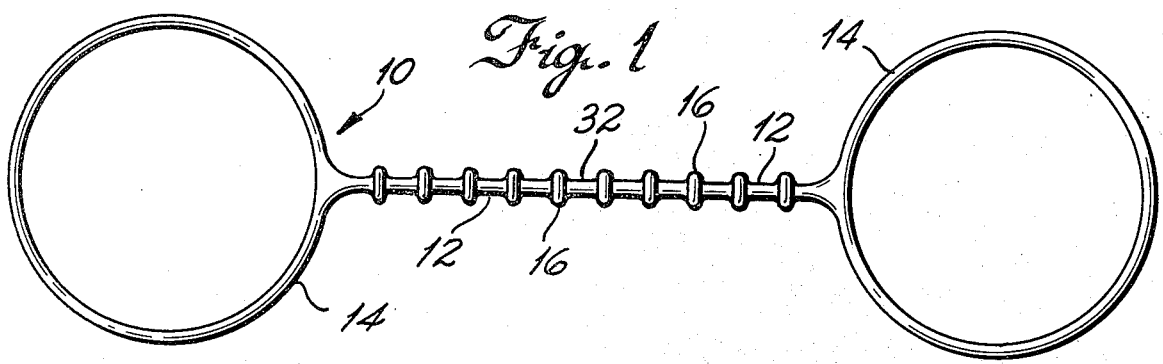
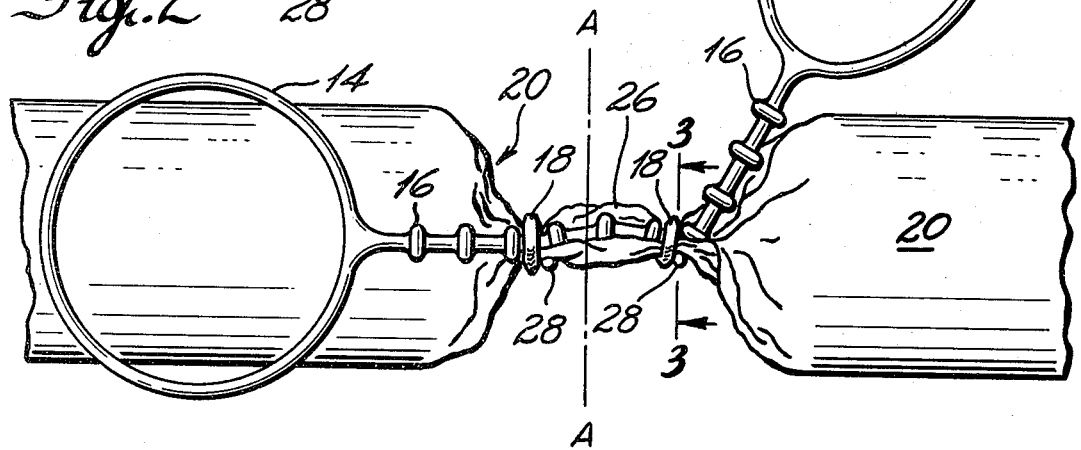
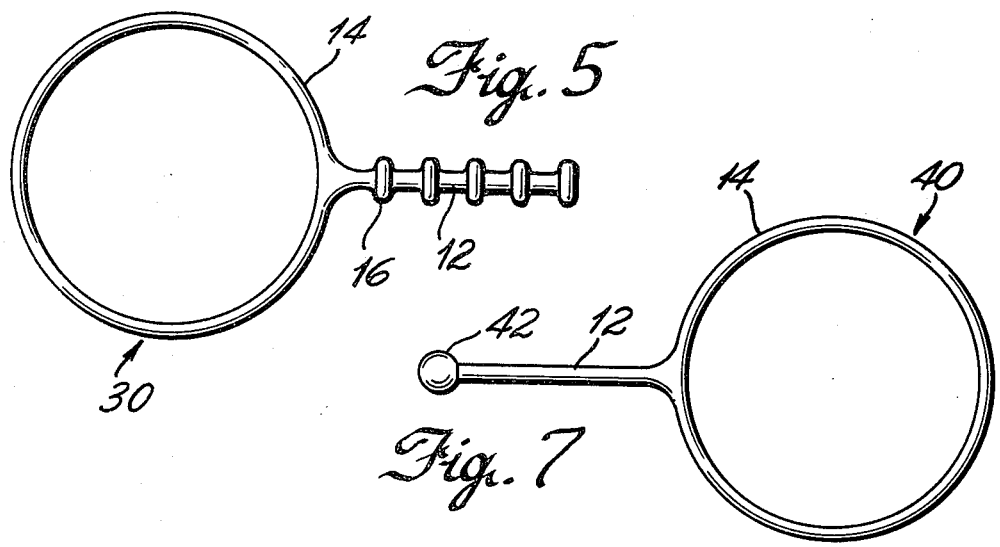

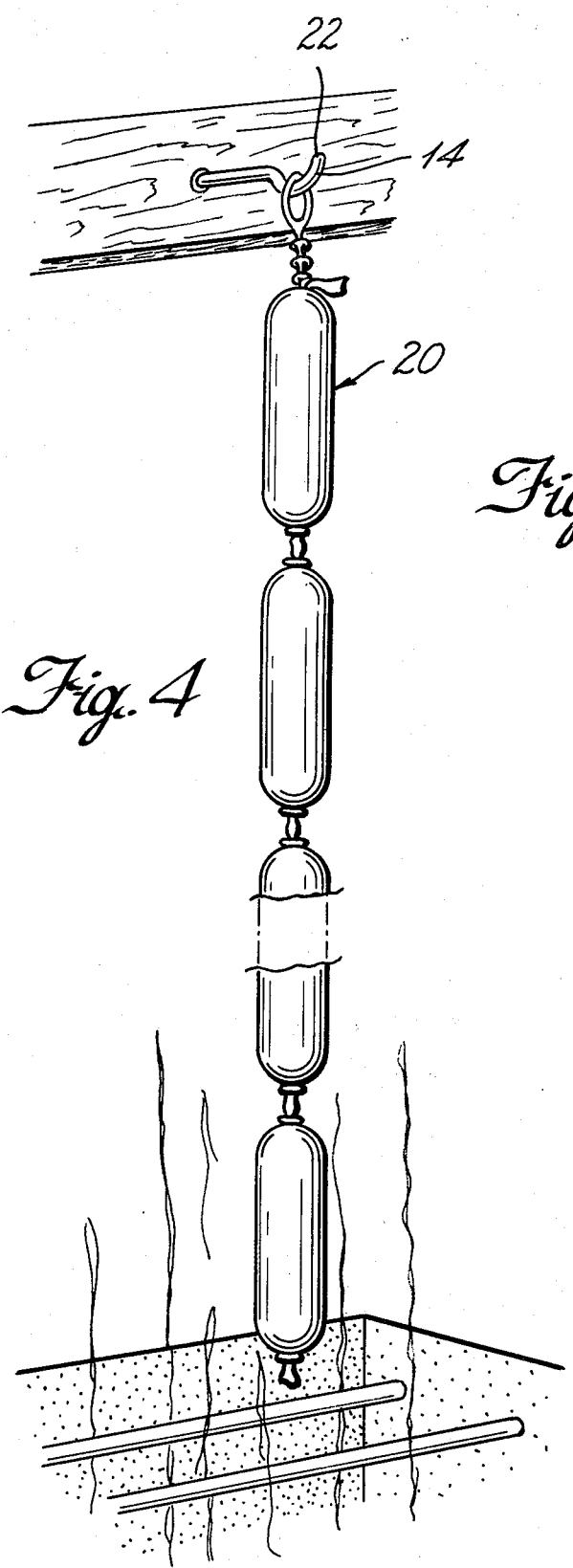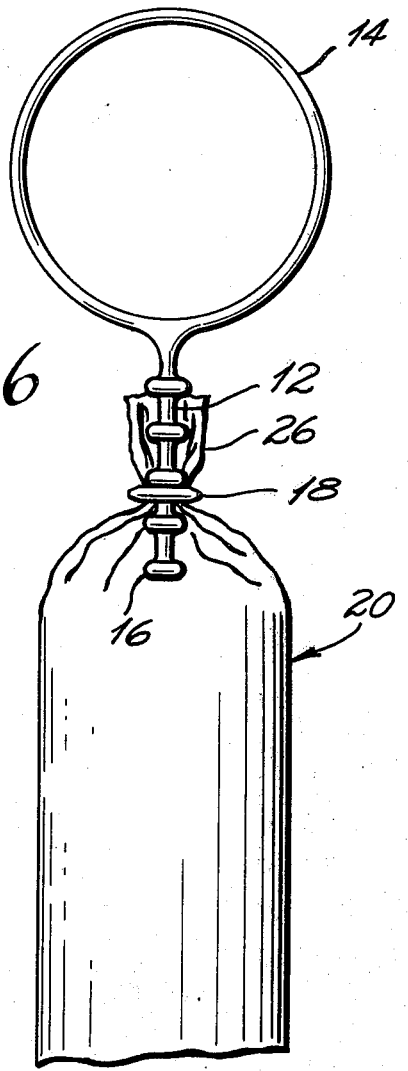

HANGER MEMBER

BACKGROUND OF THE INVENTION

1. Field of the Invention

This invention relates to processing of sausage and more particularly to improvements in methods and apparatus for hanging sausage casings during processing and handling stages.

2. Description of Prior Art

The processing of link sausage generally requires hanging, draping or looping of links about a hook or rack device during smoking and other preparatory stages of processing.

A typical method of hanging sausage links involves the use of string or other similar type devices fastened about the converged casing section intermediate two links. Practice involves manually tying the string thereabout and thereafter subjecting such string and sausage links to further processing which renders the string extremely wet. This method is disadvantageous in that much manual labor is required to tie these devices about the casing and much dexterity is required on the part of the processor to hook or loop the wet string onto a hanger receiving device or about a rack for further preparatory processing as wet string loses its integrity and becomes soppy and unmanageable, and hence, hinders and interrupts the smooth flow of links during processing. Moreover, existing hanging members are conducive to cause contamination of the product. Cotton, for example, sometimes becomes moldy and fosters other forms of contamination. Furthermore, such members oftentimes lose strength or unravel and consequently drop the hung sausage links onto the processing areas. For example, links dropped in the smokehouse may burn up on the grates therebelow or become contaminated or incur "burn" marks thereon necessitating the product be scrapped. Product that is salvageable naturally costs more to manufacture due to reprocessing costs.

SUMMARY OF THE INVENTION

The general object of the present invention is to provide an improved method and apparatus for hanging sausage links which circumvents the problems heretofore noted.

More specifically, it is an object to provide an improved method and apparatus for hanging sausage links which is capable of manufacture at low cost, is of a one piece construction and so designed to be readily and easily attached in mass production operation and yet yield reliable performance after much handling and abuse during the sausage processing operations.

It is a specific object of the present invention to provide an improved method of rigidly attaching a hanger member to a sausage casing which prevents detachment therebetween.

An additional object of the present invention is to provide a hanger member which retains stability during sausage processing operations to facilitate handling thereof and which will not lose its strength, become unraveled or promote contamination of product.

Another object of the present invention is to provide a hanger member which is so constructed that its application to associated sausage casings requires no alteration to the design, shape or construction of existing casings.

A further object of the present invention is to provide a hanger member which lends itself to reuse or recyling.

These and other objects and advantages of the invention will become apparent in the following specification and claims when read in conjunction with the following drawings.

DETAILED DESCRIPTION OF THE DRAWINGS

In describing the present invention, references will be made to the accompanying drawings forming a part of the instant invention wherein:

FIG. 1 is a plan view of the one piece hanger member constructed in accordance with the instant invention.

FIG. 2 is a fragmented plan view illustrating a method of rigidly attaching the hanger member of FIG. 1 to the shank or converged section of a casing between sausage links.

FIG. 3 is a sectional view taken along line 3—3 of FIG. 2 of the mechanical fastener, hanger member and sausage casing.

FIG. 4 is a perspective view of a smokehouse, broken away, illustrating the use of the hanger member of the instant invention to hang a plurality of sausage links above the open grating in the smokehouse.

FIG. 5 is a plan view of an alternate embodiment of the hanger member of the instant invention.

FIG. 6 is a plan view illustrating a method of rigidly attaching the hanger member of FIG. 5 to the shank portion of the casing.

FIG. 7 is a plan view of a second alternate embodiment of the hanger member of the instant invention.

DETAILED DESCRIPTION OF THE INVENTION

Referring to FIGS. 1 and 2 of the drawings, there is shown a hanger member indicated generally at 10 having a stem 12 on which a pair of anchorage means or loops 14 are suspended and a plurality of spaced nubs or stops 16 on stem 12 constructed in accordance with the instant invention.

Hanger member 10 is preferably constructed of a thermoplastic recyclable material such as nylon or a thermoset material having flexible characteristics to facilitate attachment by clips 18 to a sausage casing 20 as shown in FIGS. 2 and 3 and yet having sufficient strength to avoid failure, and consequent dropping of sausage, during processing operations. In practice, hanger member 10 is fastened at approximately every 18th sausage link and is sheared at section A—A shown in FIG. 2 along with the casing resulting in sausage strings of nine which are thereafter hung by their respective loop 14 about hook 22 in a smokehouse as shown in FIG. 4. Consequently it is readily apparent that the utilization of member 10 with its dual loop feature permits hanger fastening at every other fastening point normally required by existing hanging methods thereby resulting in cost savings to the processor. It is to be noted that ceiling heights of smokehouses and other processing areas limit string length to approximately nine sausage links and that member 10 is designed to handle strings much in excess of nine referred to hereinbefore.

Hanger member 10 is preferably circular in cross-section or may be of square or rectangular configuration. Member 10 can be manufactured in a multicavity die of an injection molding process which yields a generally circular cross-section as indicated at 24 in FIG. 3. Member 10 may also be produced from flat stock material which is die cut or sheared to the configuration shown in FIG. 1, hence yielding a square or rectangular cross-section much like that commonly utilized to secure six packs of beverages. It is insignificant if the periferal edges obtained in either method are irregular as the uses intended for member 10 do not require precision fit or appearance.

Stem 12 should be sufficiently pliable to readily permit positioning thereof immediately adjacent the shank portion 26 of casing 20 for clipping thereto by clips 18 as shown in FIGS. 2 and 3. Clips 18 are oriented relative to stem 12 between a pair of nubs 16 so that upon completion of clipping, end portions 28 of clips 18 are bent to the underside of stem 12 and casing 20 as shown in FIG. 3. This ensures that clip 18 will rest securely against stem 12 thus minimizing the risk of nub 16 pulling therepast and releasing the string of sausages onto the grates or floors of the processing areas where they may be destroyed, contaminated or otherwise rendered unsaleable.

It is to be recognized that the preferred form of the invention utilizes an excess number of nubs 16 over that actually required for clipping. The presence of additional nubs permits ready attachment of member 10 to sausage casings during high speed line operations wherein member 10 is automatically fed and fastened to a rapidly moving line of sausage links. The extra nubs eliminate the need for precise longitudinal positioning and alignment of member 10 relative to shank portion 26. Extra nubs may also function as secondary stop means where clip 18 is fastened further up stem 12 at a point closer to loop 14 as shown in FIG. 6 thereby preventing complete detachment from the sausage string upon failure of a nub. In this regard nubs 16 are formed to bias clips 18 inwardly for resting on stem 12 during the clipping operation.

An alternate embodiment of hanger member 10 is designated as 30 in FIG. 5 which utilizes like reference characters for like parts hereinbefore described. As can be readily recognized, member 30 is identical to either end portion of member 10 by visualizing portion 32 in FIG. 1 as being removed. Member 30 is produced by use of an insert in the die cavity during the injection molding process, or by shearing member 10. Member 30 is used primarily for hanging individual open-ended empty sausage casings which are first secured to hanger members 30 for reasons of economy prior to filling as shown in FIG. 6. After the hanger member 30 is secured, the casing is filled and tied to seal in the sausage contents and finally hung by loop 14 in the processing areas.

It is to be noted that member 30 may also be utilized to hang strings of sausage links however it use would require twice as many fastening points as that for member 10 in high speed mass production operation.

A second alternate embodiment of hanger member 10 is designated as 40 and shown in FIG. 7 which utilizes like reference characters for like parts hereinbefore described. Member 40 is identical to member 30 with the exception of nubs 16 which are deleted and replaced with a generally circular nub 42 which performs the stop function.

Thus it will be apparent to those skilled in the art that the present invention provides a substantial improvement over prior art devices in that its unique arrangement and interaction of component features lend itself to economies of manufacture and substantial savings to sausage processing operations. Moreover the hanging member may be readily reused over and over again by simply removing it from the casin upon completion of processing and sterilizing it before reuse.

While the hanging member hereinbefore described is effectively adapted to fulfill the objects stated, it is to be understood that the invention is not intended to be confined to the particular preferred embodiment disclosed or for use solely with the type casing shown inasmuch as it is adaptable for use with other casings utilized for filling many other types of products and is susceptible of various modifications without departing from the scope of the appended claims.

I claim:

1. A flexible hanger member adapted to be attached by clip means to a casing for a plurality of link type product to permit hanging thereof during processing operation, the member comprising:
    resilient stem means adapated to receive the clip means for attaching said member to the casing;
    resilient loop means positioned generally adjacent each end of said stem means to facilitate hanging the product from either of said loop means; and
    anchorage means positioned on said stem means generally intermediate said loop means to prevent slippage along and detachment of said stem means from the casing and clip means once it is fastened thereto, said anchorage means comprising a plurality of spaced nubs integrally formed along said stem means.

2. A hanger member according to claim 1 wherein said member is a one piece thermoplastic molding.

3. A hanger member according to claim 1 wherein said member is a one piece die cut member.

* * * * *